United States Patent
Kerth et al.

(10) Patent No.: US 7,177,617 B2
(45) Date of Patent: Feb. 13, 2007

(54) METHOD AND APPARATUS FOR ENHANCING SIGNAL QUALITY WITHIN A WIRELESS RECEIVER

(75) Inventors: Donald A. Kerth, Austin, TX (US); G. Tyson Tuttle, Austin, TX (US)

(73) Assignee: Silicon Laboratories, Austin, TX (US)

( * ) Notice: Subject to any disclaimer, the term of this patent is extended or adjusted under 35 U.S.C. 154(b) by 442 days.

(21) Appl. No.: 10/749,012

(22) Filed: Dec. 30, 2003

(65) Prior Publication Data
US 2005/0143040 A1  Jun. 30, 2005

(51) Int. Cl.
*H04B 1/10* (2006.01)
(52) U.S. Cl. .............. 455/302; 455/63.1; 455/67.13; 455/296; 375/346
(58) Field of Classification Search .......... 455/67.11, 455/67.13, 255, 296, 302, 312, 313, 323, 455/334, 63.1, 295, 324; 375/322, 324, 346
See application file for complete search history.

(56) References Cited

U.S. PATENT DOCUMENTS

| 5,517,689 A | * | 5/1996 | Hayashihara ............... 329/306 |
| 5,712,879 A | * | 1/1998 | Tatsuta et al. .............. 375/330 |
| 5,818,543 A | * | 10/1998 | Lee .......................... 455/277.1 |
| 6,101,226 A | * | 8/2000 | Ohta et al. .................. 375/332 |
| 6,694,131 B1 | * | 2/2004 | Lakkis ....................... 455/302 |

* cited by examiner

*Primary Examiner*—Quochien B. Vuong
(74) *Attorney, Agent, or Firm*—Maximilian R. Peterson; Antony P. Ng; Dillon & Yudell LLP

(57) ABSTRACT

A method and apparatus for enhancing signal quality within a wireless receiver are disclosed. An image of a desired signal is down-converted to a baseband signal by a digital down converter. The energy of the baseband signal is subsequently determined. If the energy of the baseband signal is equal to or greater than a predetermined threshold, then the IF is swapped for any incoming signals. If the energy of the baseband signal is less than the predetermined threshold, then the IF is maintained for any incoming signals.

27 Claims, 4 Drawing Sheets

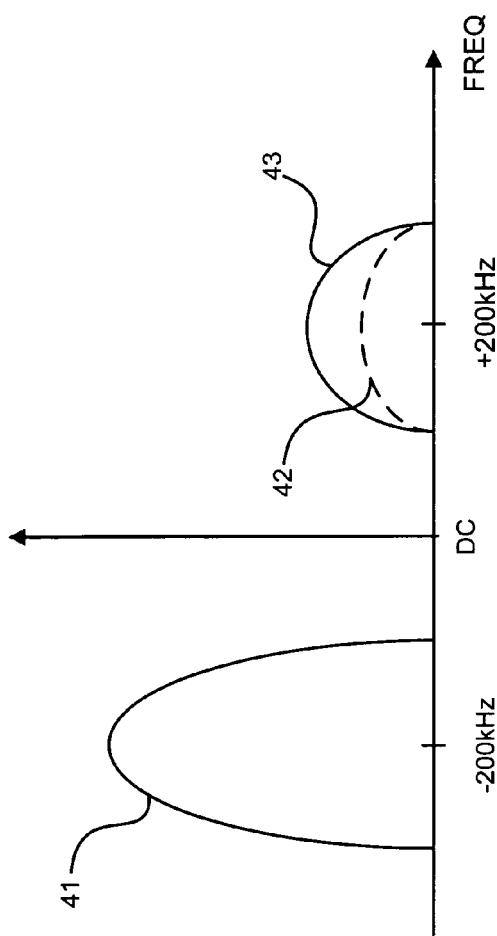
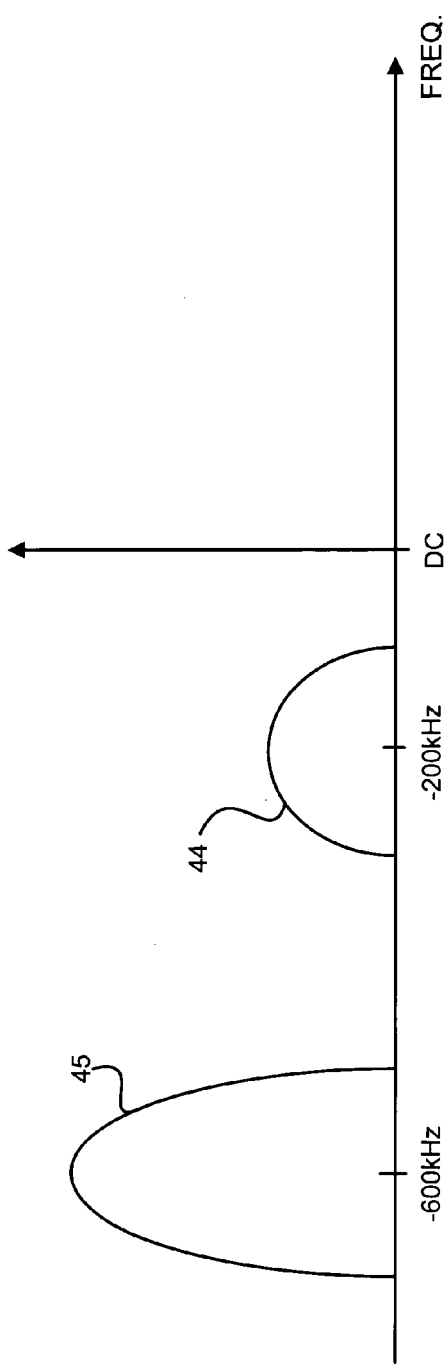
Figure 4a
Figure 4b

METHOD AND APPARATUS FOR ENHANCING SIGNAL QUALITY WITHIN A WIRELESS RECEIVER

BACKGROUND OF THE INVENTION

1. Technical Field

The present invention relates to wireless transceivers in general, and in particular to radio frequency transceivers. Still more particularly, the present invention relates to a method and apparatus for enhancing signal quality within a radio frequency receiver.

2. Description of Related Art

Unlike wireline communication environments, a wireless communication environment has to accommodate a large number of users sharing different parts of the frequency spectrum with very strong signals coexist adjacent to very weak signals. Hence, a wireless receiver should be able to select the signal of interest while rejecting all other signals. According to their respective architecture, wireless receivers can generally be classified under two categories, namely, homodyne receivers and heterodyne receivers.

With a homodyne receiver, the desired signal is initially selected by a bandselect filter and is subsequently amplified by a low-noise amplifier. The desired signal is then frequency translated by a mixer to DC before other baseband operations are performed on the desired signal. With a heterodyne receiver, the desired signal is sent through receiver components similar to those in the homodyne receiver with the exception that the desired signal is translated to an intermediate frequency (IF) when signal processing operations are performed.

For heterodyne wireless receivers, image rejection refers to the ability to select the desired signal from the image of the desired signal spaced away by twice the IF signal. Basically, a heterodyne wireless receiver should be able to select the desired signal from its image. Otherwise, the subsequent detector circuit within the heterodyne wireless receiver will not be able to distinguish between the desired signal and the image signal, and the output becomes the superposition of both signals. Accordingly, image rejection is one of the various functions that heterodyne wireless receivers need to provide.

The present disclosure provides a method and apparatus for alleviating the image problem in signals within a wireless receiver such that the quality of the signals within the wireless receiver can be enhanced.

SUMMARY OF THE INVENTION

In accordance with a preferred embodiment of the present invention, an image of a desired signal is down-converted to a baseband signal by a digital down converter. The energy of the baseband signal is then determined. If the energy of the baseband signal is equal to or greater than a predetermined threshold, then the IF is swapped for any incoming signals. If the energy of the baseband signal is less than the predetermined threshold, then the IF is maintained for any incoming signals.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 4a–4b graphically illustrate the potential improvement in the interference performance in accordance with a preferred embodiment of the present invention.

DETAILED DESCRIPTION OF A PREFERRED EMBODIMENT

Figure 1:
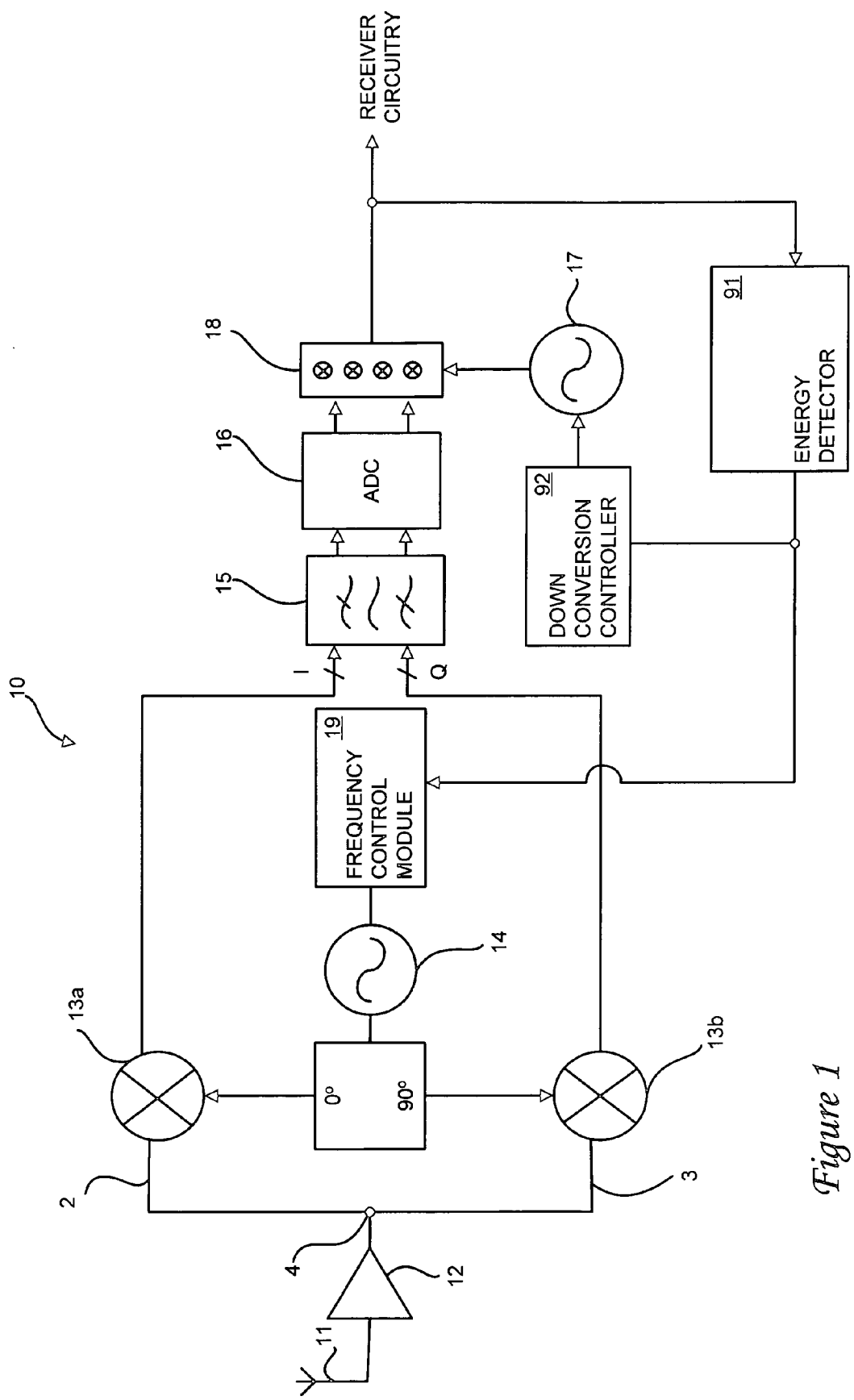
FIG. 1 is a block diagram of a wireless receiver, in accordance with a preferred embodiment of the present invention.

Referring now to the drawings and in particular to FIG. 1, there is depicted a block diagram of a wireless receiver, in accordance with a preferred embodiment of the present invention. As shown, an RF receiver 10 includes an antenna 11, a low-noise amplifier 12, a pair of RF mixers 13a–13b, an IF filter 15, an analog-to-digital converter (ADC) 16 and a digital down converter 18 along with additional receiver circuitry (not shown) that are well-known to those skilled in the art. In addition, RF receiver 10 includes a radio frequency local oscillator (RFLO) 14 coupled to RF mixers 13a–13b for generating an in-phase signal and a quadrature signal. RF receiver 10 also includes an LO frequency control module 19 coupled to RFLO 14 for controlling the oscillation frequency of RFLO 14. Similarly, a down conversion controller 92 is coupled to a digital complex sinusoid signal IFLO 17 for controlling the oscillation frequency of IFLO 17 that is connected to digital down converter 18. An energy detector 91 is coupled to the output of digital down converter 18 to receive down-converted signals from digital down converter 18. Based on the information from the received down-converted signals, energy detector 91 can selectively adjust the operation of RFLO 14 and IFLO 17 via LO frequency control module 19 and down conversion controller 92, respectively.

RF signals are initially received by antenna 11. After passing through low-noise amplifier 12, the RF signals enter an in-phase path 2 and a quadrature path 3 via a junction 4. A first input of RF mixer 13a is connected to in-phase path 2, and a second input of RF mixer 13a is connected to an in-phase output of RFLO 14. The output of RF mixer 13a provides in-phase IF signals to IF filter 15 via an in-phase signal path I. Similarly, a first input of RF mixer 13b is connected to quadrature path 3, and a second input of RF mixer 13b is connected to a 90° out-of-phase output of RFLO 14. The output of RF mixer 13b provides quadrature IF signals to IF filter 15 via a quadrature signal path Q. Both IF signal paths for RF receiver 10 are approximately 200 kHz.

In the embodiment shown in FIG. 1, the IF signals within in-phase signal path I and quadrature signal path Q of RF receiver 10 are completely independent from each other until the final down conversion to a baseband signal. In other words, each of the IF signal paths I and Q does not have a complex transfer function. Because the transfer functions for the IF signal paths I and Q are real, an RF signal can be down-converted to a +200 kHz IF signal or a −200 kHz IF signal by changing the oscillation frequency of RFLO 14.

Figure 2:
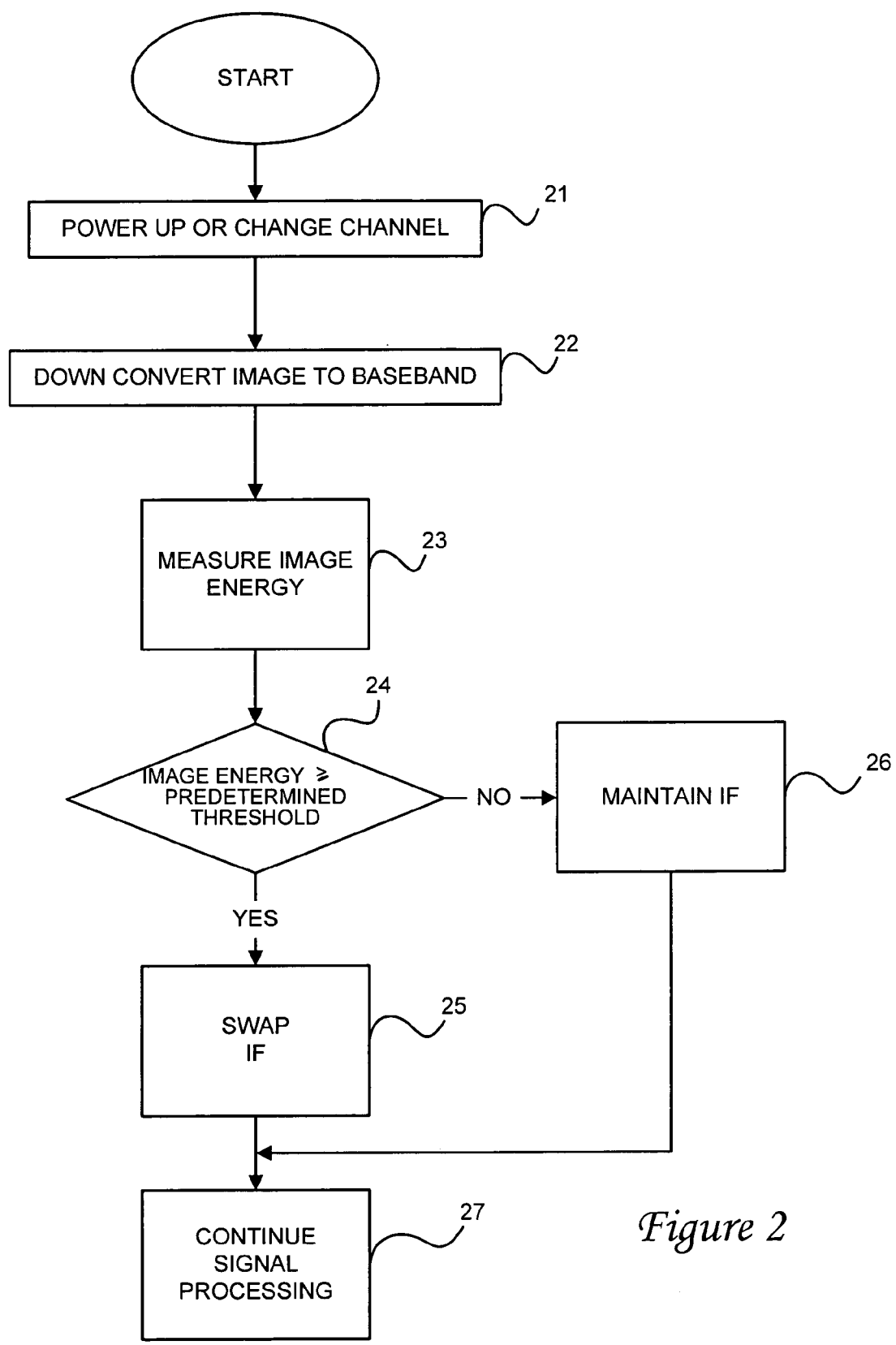
FIG. 2 is a high-level logic flow diagram of a method for enhancing signal quality within the wireless receiver from FIG. 1, in accordance with a preferred embodiment of the present invention.

With reference now to FIG. 2, there is depicted a high-level logic flow diagram of a method for enhancing signal quality within a wireless receiver, such as wireless receiver 10 from FIG. 1, in accordance with a preferred embodiment of the present invention. When the wireless receiver is being powered up or undergoing a channel change, as shown in block 21, an image of a desired signal is down-converted to a baseband signal, as depicted in block 22. The down-conversion of an image to a baseband signal is performed via two stages. The first stage is to utilize LO frequency control module 19 (from FIG. 1) to change the oscillation frequency of RFLO 14 (from FIG. 1) as follows:

$$f_{RFLO} = f_{CH} - f_{IF}$$

where $f_{RFLO}$=oscillation frequency of RFLO 14
$f_{CH}$=frequency of channel
$f_{IF}$=frequency of IF signal The second stage is to adjust the digital complex sine wave used within digital down converter 18 (from FIG. 1) by changing the frequency of IFLO 17 (from FIG. 1) via down conversion controller 92 (from FIG. 1). Specifically, the adjustment is performed as follows:

$$IFLO(t) = e^{+j\omega_{IF}t}$$

where $e^{+j\omega_{IF}t} = \cos\omega_{IF}t + j\sin\omega_{IF}t$, $\omega_{IF}=2\pi f_{IF}$ No modification to the IF signal paths I and Q within RF receiver 10 in FIG. 1 is required.

Next, the energy of the down-converted image signal is measured, as shown in block 23. For receiver 10 in FIG. 1, the image energy measurement can be performed by energy detector 91 that is coupled to the output of digital down converter 18. A determination is then made as to whether or not the energy of the down-converted image signal is equal to or greater than a predetermined threshold, as depicted in block 24. For the present embodiment, the predetermined threshold is approximately −71 dBm. If the energy of the down-converted image signal is equal to or greater than the predetermined threshold, the IF is swapped, as shown in block 25. For receiver 10 in FIG. 1, IF swapping includes changing the local oscillation frequency of RFLO 14 via frequency control module 19, as follows:

$$f_{RFLO} = f_{CH} + f_{IF}$$

where $f_{RFLO}$=oscillation frequency of RFLO 14
$f_{CH}$=frequency of channel
$f_{IF}$=frequency of IF signal In addition, IF swapping also includes maintaining the oscillating frequency of IFLO 17 (from FIG. 1) via down converter controller 92 (from FIG. 1), as follows:

$$IFLO(t) = e^{+j\omega_{IF}t}$$

where $e^{+j\omega_{IF}t} = \cos\omega_{IF}t + j\sin\omega_{IF}t$ $\omega_{IF}=2\pi f_{IF}$ Otherwise, if the energy of the down-converted image signal is less than the predetermined threshold, the IF is maintained, as depicted in block 26. For receiver 10 in FIG. 1, maintaining IF includes maintaining the local oscillation frequency of RFLO 14 via frequency control module 19, as follows:

$$f_{RFLO} = f_{CH} - f_{IF}$$

where $f_{RFLO}$=oscillation frequency of RFLO 14
$f_{CH}$=frequency of channel
$f_{IF}$=frequency of IF signal In addition, maintaining IF also includes changing the oscillating frequency of IFLO 17 (from FIG. 1) via down converter controller 92 (from FIG. 1), as follows:

$$IFLO(t) = e^{-j\omega_{IF}t}$$

where $e^{+j\omega_{IF}t} = \cos\omega_{IF}t - j\sin\omega_{IF}t$ $\omega_{IF}=2\pi f_{IF}$ Subsequently, normal signal processing is resumed, as shown in block 27.

For performing the second stage of the image signal down-conversion, instead of adjusting the digital complex sine wave used within digital down converter 18 in FIG. 1, a switch can be utilized to swap the two IF signal paths (from +200 kHz to −200 kHz). An implementation of a switch is further illustrated in details in FIG. 3.

Figure 3:
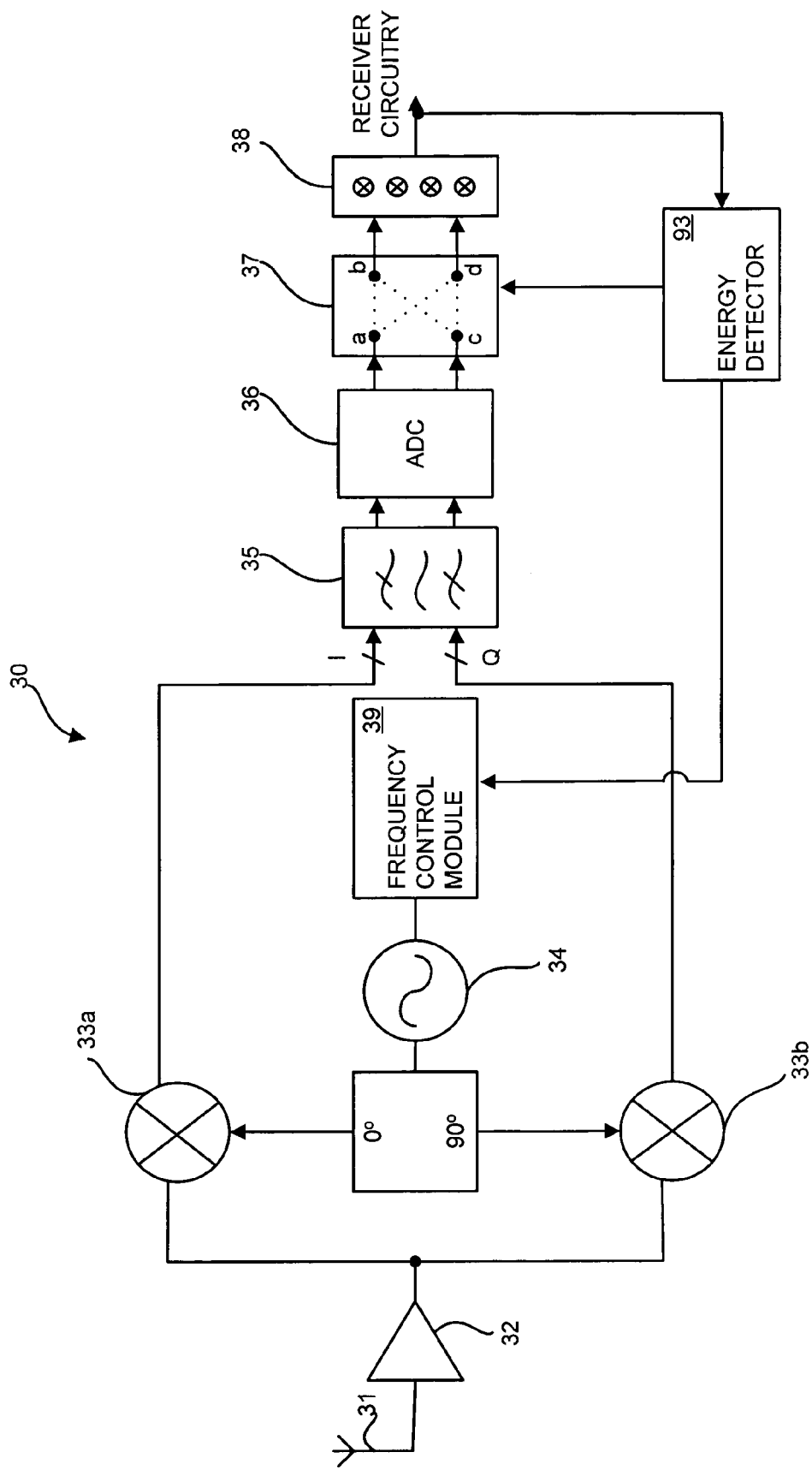
FIG. 3 is a block diagram of a wireless receiver for implementing the method of FIG. 2, in accordance with an alternative embodiment of the present invention.

Referring now to FIG. 3, there is depicted a block diagram of a wireless receiver for implementing the method of FIG. 2, in accordance with an alternative embodiment of the present invention. As shown, an RF receiver 30 includes an antenna 31, a low-noise amplifier 32, a pair of RF mixers 33a–33b, an IF filter 35, an ADC 36, a switch 37 and a digital down converter 38 along with additional receiver circuitry (not shown) that are well-known to those skilled in the art. In addition, RF receiver 30 includes a RFLO 34 coupled to RF mixers 33a–33b. RF receiver 30 also includes an LO frequency control module 39 coupled to RFLO 34 for controlling the oscillation frequency of RFLO 34. An energy detector 93 is coupled to the output of digital down converter 38 for measuring the energy the down-converted image signal (i.e., block 23 of FIG. 2). Based on the energy information from the received down-converted image signal, energy detector 91 can selectively adjust the node connections within switch 37 and the oscillation frequency of RFLO 34 via frequency control module 93.

The basic functional components of RF receiver 30 are similar to those of RF receiver 10 from FIG. 1. The main difference between RF receiver 30 and RF receiver 10 from FIG. 1 is that instead of using an IFLO and a down conversion controller to adjust the digital complex sine wave used in a digital down converter, a switch, such as switch 37, is used to swap the IF signal paths I and Q. Nodes a and b of switch 37 are connected to the IF signal path I, and nodes c and d of switch 37 are connected to the IF signal path Q. The above-mentioned down-conversion of an image to a baseband signal (i.e., block 22 in FIG. 2) can be performed by changing the initial connections of node a-to-node b and node c-to-node d to subsequent connections of node a-to-node d and node c-to-node b, respectively. Although switch 37 is shown to be located between ADC 36 and digital down converter 38 in FIG. 3, switch 37 can be located anywhere within the IF signal paths. For example, switch 37 can be located between IF filter 35 and ADC 36 or between RF mixers 33a–33b and IF filter 35.

For RF receiver 30, the IF swapping (i.e., block 25 in FIG. 2) includes the changing of the local oscillation frequency of RFLO 34 via frequency control module 93 as $f_{RFLO} = f_{CH} + f_{IF}$, along with maintaining the node connections in switch 37 as node a-to-node d and node c-to-node b. On the other hand, the maintaining IF (i.e., block 26 in FIG. 2) for receiver 30 includes maintaining the local oscillation frequency of RFLO 34 via frequency control module 93 as $f_{RFLO} = f_{CH} - f_{IF}$, along with changing the node connections in switch 37 as node a-to-node b and node c-to-node d.

With reference now to FIGS. 4a–4b, there are illustrated the potential improvement in the interference performance in accordance with a preferred embodiment of the present invention. In FIG. 4a, because of the limited image rejection on a −400 kHz interferer 41, −400 kHz interferer 41 images into the +200 kHz side as an interference signal 42, and as a result, interference signal 42 interferes with a desired signal 43. FIG. 4b shows the spectrum of a swapped IF according to the present invention. As shown in FIG. 4b, −400 kHz interferer 41 is located at 600 kHz and a desired signal 44 is located at −200 kHz. Thus, −400 kHz interferer 41 is no longer an image of desired signal 43.

As has been described, the present invention provides a method and apparatus for enhancing signal quality within a wireless receiver. Although the down-conversion is shown as $f_{RFLO}=f_{CH}-f_{IF}$, it is understood by those skilled in the art that down-conversion can be performed as $f_{RFLO}=f_{CH}+f_{IF}$ and the image energy will be measured at +IF correspondingly.

The method and apparatus of the present invention are applicable to RF receivers suitable to be used in TDMA communication networks, such as Global System for Mobile communications (GSM) networks. Although an RF receiver is used to illustrate the present invention, it is understood by those skilled in the art that the present invention is also applicable to the receiver portion of wireless transceivers.

While the invention has been particularly shown and described with reference to a preferred embodiment, it will be understood by those skilled in the art that various changes in form and detail may be made therein without departing from the spirit and scope of the invention.

What is claimed is:

1. A method for improving signal quality within a radio frequency (RF) receiver, said method comprising:
   down-converting an image of a desired signal to a baseband signal;
   determining an energy of said baseband signal;
   in response to a determination that said energy of said baseband signal being equal to or greater than a predetermined threshold, swapping intermediate frequency (IF) for an incoming signal by changing an oscillation frequency of a local oscillator within said RF receiver; and
   in response to a determination that said energy of said baseband signal being less than said predetermined threshold, maintaining IF for an incoming signal.

2. The method of claim 1, wherein said method further includes continuing normal signal processing.

3. The method of claim 1, wherein said down-converting is performed by $$f_{RFLO}=f_{CH}-f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver and adjusting a digital complex sinusoid signal within an intermediate frequency local oscillator (IFLO) by $$IFLO(t)=e^{+j\omega_{IF}t}$$

where $e^{+j\omega_{IF}t}=Cos\omega_{IF}t+jSin\omega_{IF}t$ $\omega_{IF}=2\pi f_{IF}$.

4. The method of claim 3, wherein said swapping IF is performed by $$f_{RFLO}=f_{CH}+f_{IF}$$

where $f_{RFLO}$=said local oscillation frequency
$f_{CH}$=said channel frequency
$f_{IF}$=said IF signal frequency
and $$IFLO(t)=e^{+j\omega_{IF}t}$$

where $e^{+j\omega_{IF}t}=Cos\omega_{IF}t+jSin\omega_{IF}t$ $\omega_{IF}=2\pi f_{IF}$.

5. The method of claim 4, wherein said maintaining IF is performed by $$f_{RFLO}=f_{CH}-f_{IF}$$

where $f_{RFLO}$=said local oscillation frequency
$f_{CH}$=said channel frequency
$f_{IF}$=said IF signal frequency
and $$IFLO(t)=e^{-j\omega_{IF}t}$$

where $e^{-j\omega_{IF}t}=Cos\omega_{IF}t-jSin\omega_{IF}t$ $\omega_{IF}=2\pi f_{IF}$.

6. The method of claim 1, wherein said down-converting is performed by $$f_{RFLO}=f_{CH}+f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver and adjusting a digital complex sinusoid signal within an intermediate frequency local oscillator (IFLO) by $$IFLO(t)=e^{-j\omega_{IF}t}$$

where $e^{-j\omega_{IF}t}=Cos\omega_{IF}t-Sin\omega_{IF}t$ $\omega_{IF}=2\pi f_{IF}$.

7. The method of claim 6, wherein said swapping IF is performed by $$f_{RFLO}=f_{CH}-f_{IF}$$

where $f_{RFLO}$=said local oscillation frequency
$f_{CH}$=said channel frequency
$f_{IF}$=said IF signal frequency
and $$IFLO(t)=e^{-j\omega_{IF}t}$$

where $e^{-j\omega_{IF}t}=Cos\omega_{IF}t-jSin\omega_{IF}t$ $\omega_{IF}=2\pi f_{IF}$.

8. The method of claim 7, wherein said maintaining IF is performed by $$f_{RFLO}=f_{CH}+f_{IF}$$

where $f_{RFLO}$=said local oscillation frequency
$f_{CH}$=said channel frequency
$f_{IF}$=said IF signal frequency
and $$IFLO(t)=e^{+j\omega_{IF}t}$$

where $e^{+j\omega_{IF}t}=Cos\omega_{IF}t+jSin\omega_{IF}t$ $\omega_{IF}=2\pi f_{IF}$.

9. The method of claim 1, wherein said down-converting is performed by $$f_{RFLO} = f_{CH} - f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver
adjusting a digital complex sinusoid signal within an intermediate frequency local oscillator (IFLO) by $$IFLO(t) = e^{-j\omega_{IF}t}$$

where $e^{-j\omega_{IF}t} = \cos\omega_{IF}t - j\sin\omega_{IF}t$ $$\omega_{IF} = 2\pi f_{IF}$$

and
swapping signals paths of an in-phase IF signal and a quadrature IF signal.

10. The method of claim 9, wherein said swapping IF is performed by $$f_{RFLO} = f_{CH} + f_{IF}$$

where $f_{RFLO}$=said local oscillation frequency
$f_{CH}$=said channel frequency
$f_{IF}$=said IF signal frequency
and
maintaining signals paths of said in-phase IF signal and said quadrature IF signal.

11. The method of claim 10, wherein said maintaining IF is performed by $$f_{RFLO} = f_{CH} - f_{IF}$$

where $f_{RFLO}$=said local oscillation frequency
$f_{CH}$=said channel frequency
$f_{IF}$=said IF signal frequency
and
swapping signals paths of said in-phase IF signal and said quadrature IF signal.

12. The method of claim 1, wherein said down-converting is performed by $$f_{RFLO} = f_{CH} + f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver
adjusting a digital complex sinusoid signal within an intermediate frequency local oscillator (IFLO) by $$IFLO(t) = e^{+j\omega_{IF}t}$$

where $e^{+j\omega_{IF}t} = \cos\omega_{IF}t + j\sin\omega_{IF}t$ $$\omega_{IF} = 2\pi f_{IF}$$

and
swapping signals paths of an in-phase IF signal and a quadrature IF signal.

13. The method of claim 12, wherein said swapping IF is performed by $$f_{RFLO} = f_{CH} - f_{IF}$$

where $f_{RFLO}$=said local oscillation frequency
$f_{CH}$=said channel frequency
$f_{IF}$=said IF signal frequency
and
maintaining signals paths of said in-phase IF signal and said quadrature IF signal.

14. The method of claim 13, wherein said maintaining IF is performed by $$f_{RFLO} = f_{CH} + f_{IF}$$

where $f_{RFLO}$=said local oscillation frequency
$f_{CH}$=said channel frequency
$f_{IF}$=said IF signal frequency
and
swapping signals paths of said in-phase IF signal and said quadrature IF signal.

15. A radio frequency (RF) receiver comprising:
means for down-converting an image of a desired signal to a baseband signal;
means for determining an energy of said baseband signal;
means for swapping intermediate frequency (IF) for an incoming signal by changing an oscillation frequency of a local oscillator within said RF receiver, in response to a determination that said energy of said baseband signal being equal to or greater than a predetermined threshold; and
means for maintaining IF for an incoming signal, in response to a determination that said energy of said baseband signal being less than said predetermined threshold.

16. The RF receiver of claim 15, wherein said means for down-converting performs a down-conversion by $$f_{RFLO} = f_{CH} - f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver and adjusting a digital complex sinusoid signal within an intermediate frequency local oscillator (IFLO) by $$IFLO(t) = e^{+j\omega_{IF}t}$$

where $e^{+j\omega_{IF}t} = \cos\omega_{IF}t + j\sin\omega_{IF}t$ $$\omega_{IF} = 2\pi f_{IF}.$$

17. The RF receiver of claim 16, wherein said means for swapping IF swaps IF by $$f_{RFLO} = f_{CH} + f_{IF}$$

where $f_{RFLO}$=said local oscillation frequency
$f_{CH}$=said channel frequency
$f_{IF}$=said IF signal frequency
and $$IFLO(t) = e^{+j\omega_{IF}t}$$

where $e^{+j\omega_{IF}t} = \cos\omega_{IF}t + j\sin\omega_{IF}t$ $$\omega_{IF} = 2\pi f_{IF}.$$

18. The RF receiver of claim 17, wherein said means for maintaining IF maintains IF by $$f_{RFLO} = f_{CH} - f_{IF}$$

where $f_{RFLO}$=said local oscillation frequency
$f_{CH}$=said channel frequency
$f_{IF}$=said IF signal frequency
and $$IFLO(t) = e^{-j\omega_{IF}t}$$

where $e^{-j\omega_{IF}t} = \cos\omega_{IF}t - j\sin\omega_{IF}t$ $$\omega_{IF} = 2\pi f_{IF}.$$

19. The RF receiver of claim 15, wherein said means for down-converting performs a down-conversion by $$f_{RFLO}=f_{CH}+f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver and adjusting a digital complex sinusoid signal within an intermediate frequency local oscillator (IFLO) by $$IFLO(t)=e^{-j\omega_{IF}t}$$

where $e^{-j\omega_{IF}t}=\cos\omega_{IF}t - j\sin\omega_{IF}t$ $\omega_{IF}=2\pi f_{IF}$.

20. The RF receiver of claim 19, wherein said means for swapping IF swaps IF by $$f_{RFLO}=f_{CH}-f_{IF}$$

where $f_{RFLO}$=said local oscillation frequency
$f_{CH}$=said channel frequency
$f_{IF}$=said IF signal frequency
and $$IFLO(t)=e^{+j\omega_{IF}t}$$

where $e^{-j\omega_{IF}t}=\cos\omega_{IF}t - j\sin\omega_{IF}t$ $\omega_{IF}=2\pi f_{IF}$.

21. The RF receiver of claim 20, wherein said means for maintaining IF maintains IF by $$f_{RFLO}=f_{CH}+f_{IF}$$

where $f_{RFLO}$=said local oscillation frequency
$f_{CH}$=said channel frequency
$f_{IF}$=said IF signal frequency
and $$IFLO(t)=e^{+j\omega_{IF}t}$$

where $e^{+j\omega_{IF}t}=\cos\omega_{IF}t + j\sin\omega_{IF}t$ $\omega_{IF}=2\pi f_{IF}$.

22. The RF receiver of claim 15, wherein said means for down-converting performs a down-conversion by $$f_{RFLO}=f_{CH}-f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver
adjusts a digital complex sinusoid signal within an intermediate frequency local oscillator (IFLO) by $$IFLO(t)=e^{-j\omega_{IF}t}$$

where $e^{-j\omega_{IF}t}=\cos\omega_{IF}t - j\sin\omega_{IF}t$ $\omega_{IF}=2\pi f_{IF}$ and swaps signals paths of an in-phase IF signal and a quadrature IF signal.

23. The RF receiver of claim 22, wherein said means for swapping IF swaps IF by $$f_{RFLO}=f_{CH}+f_{IF}$$

where $f_{RFLO}$=said local oscillation frequency
$f_{CH}$=said channel frequency
$f_{IF}$=said IF signal frequency
and maintains signals paths of said in-phase IF signal and said quadrature IF signal.

24. The RF receiver of claim 23, wherein said means for maintaining IF maintains IF by $$f_{RFLO}=f_{CH}-f_{IF}$$

where $f_{RFLO}$=said local oscillation frequency
$f_{CH}$=said channel frequency
$f_{IF}$=said IF signal frequency
and swaps signals paths of said in-phase IF signal and said quadrature IF signal.

25. The RF receiver of claim 15, wherein said means for down-converting performs a down-conversion by $$f_{RFLO}=f_{CH}+f_{IF}$$

where $f_{RFLO}$=an oscillation frequency of a local oscillator within said RF receiver
$f_{CH}$=a channel frequency within said RF receiver
$f_{IF}$=an IF signal frequency within said RF receiver
adjusts a digital complex sinusoid signal within an intermediate frequency local oscillator (IFLO) by $$IFLO(t)=e^{+j\omega_{IF}t}$$

where $e^{+j\omega_{IF}t}=\cos\omega_{IF}t + j\sin\omega_{IF}t$ $\omega_{IF}=2\pi f_{IF}$ and swaps signals paths of an in-phase IF signal and a quadrature IF signal.

26. The RF receiver of claim 25, wherein said means for swapping IF swaps IF by $$f_{RFLO}=f_{CH}-f_{IF}$$

where $f_{RFLO}$=said local oscillation frequency
$f_{CH}$=said channel frequency
$f_{IF}$=said IF signal frequency
and maintains signals paths of said in-phase IF signal and said quadrature IF signal.

27. The RF receiver of claim 26, wherein said means for maintaining IF maintains IF by $$f_{RFLO}=f_{CH}+f_{IF}$$

where $f_{RFLO}$=said local oscillation frequency
$f_{CH}$=said channel frequency
$f_{IF}$=said IF signal frequency
and swaps signals paths of said in-phase IF signal and said quadrature IF signal.

* * * * *

UNITED STATES PATENT AND TRADEMARK OFFICE
CERTIFICATE OF CORRECTION

PATENT NO. : 7,177,617 B2  Page 1 of 1
APPLICATION NO. : 10/749012
DATED : February 13, 2007
INVENTOR(S) : Kerth et al.

It is certified that error appears in the above-identified patent and that said Letters Patent is hereby corrected as shown below:

Claim 6 (Col. 6, line 39)

"where $e^{-jwIFt}$=Cosw$_{IF}$t-jSinw$_{IF}$t"

(insert --j-- before the "Sin")

Claim 20 (Col. 9, line 24)

"IFLO(t)=$e^{-jwIFt}$"

(move "IF" up to superscript with rest of expression after the "e")

Signed and Sealed this

Fifteenth Day of May, 2007

JON W. DUDAS
*Director of the United States Patent and Trademark Office*